United States Patent [19]

Murray et al.

[11] 4,170,855
[45] Oct. 16, 1979

[54] MOLDING FASTENERS

[75] Inventors: Ronald A. Murray, Methuen, Mass.; Peter D. Wright, Londonderry, N.H.

[73] Assignee: TRW Inc., Cleveland, Ohio

[21] Appl. No.: 818,025

[22] Filed: Jul. 22, 1977

[51] Int. Cl.$^2$ .............................. E04B 1/62; E06B 3/58
[52] U.S. Cl. ........................................ 52/400; 52/208; 52/717
[58] Field of Search .................. 52/400, 401, 716, 717, 52/718, 208; 296/84; 24/73 FT, 73 PM, 73 PP, 73 P

[56] References Cited

U.S. PATENT DOCUMENTS

| | | | |
|---|---|---|---|
| 3,241,277 | 3/1966 | Coppock | 52/208 |
| 3,774,363 | 11/1973 | Kent | 52/208 |
| 3,968,613 | 7/1976 | Meyer | 52/717 |
| 3,981,697 | 9/1976 | Buckthorpe | 52/400 |

FOREIGN PATENT DOCUMENTS

1237500  6/1971  United Kingdom ...................... 52/400

*Primary Examiner*—John E. Murtagh
*Attorney, Agent, or Firm*—James R. O'Connor; Martin J. O'Donnell; Thomas C. O'Konski

[57] ABSTRACT

Fasteners for securing a shaped embellishing molding across the gap between the peripheral edge of a fixed window panel and fillister support surface in which the panel is mounted in an automotive vehicle. The fasteners are integrally fabricated from a material such as plastic and are adapted to mount in the gap without the need for welded studs or other means secured to the fillister. Each fastener includes a base and pair of projecting resilient wings which are downwardly flexed to fit in the gap. The wings include beveled bearing faces that resiliently bear against the inside corner of the mounted panel and develop a reacting force tending to load and position the fastener flushly against both sides of the fillister. The beveled bearing faces also allow the fastener to take up large tolerances both in the width of the gap and in the spacing of the panel from the inner side of the fillister. Each fastener includes at least one arm projecting upwardly from the base which is adapted to project from the gap and to engage within and retain the molding in position. The arm is made substantially stiff and inflexible relative to the base. As a result, when the arm and molding mounted thereto are pulled away from the window panel, the entire fastener tilts in the gap and the beveled bearing faces are loaded more tightly into the space behind the panel, thus providing increased resistance to dislodgement of the fastener from the gap. Various different embodiments of the fastener are disclosed.

29 Claims, 10 Drawing Figures

MOLDING FASTENERS

BACKGROUND OF THE INVENTION

1. Field of the Invention

This invention relates generally to means for fastening a strip element relative to the edge of a panel and support structure adjacent the panel and, more particularly, to resilient fasteners for mounting a shaped molding across the gap between the peripheral edge of a window panel and bodywork supporting the panel in an automotive vehicle.

2. Description of the Prior Art

In automotive vehicles, the fixed windows, such as the windshield and rear window, are typically held within a fillister formed in the bodywork defining the window opening by means of an adhesive. The fillister includes a pair of oblique sides, a first of which is generally parallel to the edge of the panel and a second of which is generally parallel to the inside major surface of the panel. The adhesive is typically applied in a continuous beading around the periphery of the inside surface of the panel and the panel, with the adhesive so applied, is pressed against the fillister so that the adhesive is squeezed between the panel and the second side of the fillister.

When the window panel is mounted in this manner, a gap remains around the periphery of the panel between the edge of the panel and the first side of the fillister. This gap is typically concealed by an embellishing element, which in most cases is formed as a metal molding strip shaped to match the periphery of the opening.

To provide the window, molding, and surrounding bodywork with an aesthetically neat appearance, it is important that the molding be properly positioned relative to window and fillister around the entire periphery of the window. It is also important that the molding be firmly retained in position to prevent the inadvertent loosening or detachment of the molding during the life of the vehicle.

The customary way of mounting the molding across the gap has been to weld a plurality of headed studs in the fillister at spaced positions around the periphery of the opening. Specially designed molding clips are then anchored to these studs. The clips typically include members that protrude from the gap and engage within the molding to hold the molding in position over the gap. Examples of stud engaging fastening clips of this type are shown in U.S. Pat. No. 3,631,569 and British Pat. No. 1,292,103.

The primary drawback of the stud fastening technique is its relative inconvenience. The welding of the studs within the fillister takes considerable time and thus slows the vehicle assembly process. The welding operation must also be carefully controlled in terms of stud height and alignment if the clips and moldings are to fit properly. Further, the welding operation stresses the metal of the fillister and often leaves a carbon smut deposit at the base of the stud, thus hindering effective paint adhesion to the fillister adjacent the stud base and presenting a condition that is conductive to premature rusting of the bodywork adjacent the studs from moisture that may leak into the area.

A number of proposals have been made for fasteners that are capable of attaching a molding across the gap between a mounted window panel and fillister without the need for welded studs. These stud-less fasteners have typically been formed as molded plastic units which include members that embrace the edge of the window panel to retain the fastener in position in the fillister and members that protrude from the gap and snap within or otherwise engage the molding to retain the molding in position across the gap. Examples of such fasteners are shown in U.S. Pat. No. 3,611,663 and in British Pat. Nos. 1,232,344 and 1,237,500.

Prior stud-less fasteners of the above type, though generally recognized as effective in simplifying the vehicle assembly process, have had a number of problems that have militated against their widespread acceptance and use by vehicle manufacturers. One problem relates to their inability to accommodate the manufacturing and assembly tolerances that normally exist between the window panel and fillister in the vehicles. Some prior stud-less fasteners are capable of accommodating tolerances in one direction; namely, in the width of the gap between the edge of the window panel and the first side of the fillister.

Typically, members in such fasteners that embrace the edge of the panel are formed as upwardly directed, resilient wings that can be downwardly flexed to fit within a gap having a width anywhere within a certain range. However, most of these fasteners have difficulty accommodating tolerances in the other, transverse direction; namely, in the spacing between the inside surface of the window panel and the second side of the fillister. This problem results because the prior fasteners tend to position themselves in reference to the edge of the mounted panel. If, for example, the spacing between the mounted panel and the second side of the fillister is too large, the fastener protrudes too far from the fillister and the molding in turn, is bowed away from the body in the vicinity of the fastener. If, on the other hand, the spacing is too small, the fastener is set back too far within the fillister and the molding, in turn, either is bowed inwardly in the vicinity of the fastener or is prevented from engaging the fastener at all. The appearance of the molding is thus adversely affected.

Another problem with prior stud-less fasteners is that they have had difficulty meeting automotive manufacturers' specifications with respect to the amount of pulling force that can be applied to the molding prior to detachment of the molding. In some cases, the members on the fasteners that engage and retain the molding are so flexible that the molding can easily be pulled from the members when force is applied to the molding, particularly when the side of the molding that overlaps the window panel is pulled away from the panel. In other cases, the retaining members adequately hold the molding, but the fasteners themselves are such that, when the molding is pulled away from the window panel, the entire fastener is easily pulled from the gap. While it is desirable that the molding be detachable from the fasteners and the fasteners be removable from the gap in the event repair or replacement of the molding or window panel is required, the fasteners should not permit the molding to be detached inadvertently such as, for example, when an object is forced between the molding and panel.

OBJECTS OF THE INVENTION

It is, therefore, a primary object of this invention to provide improved means for fastening a strip element relative to the edge of a panel and support surface adjacent the panel.

Another object of the invention is to provide an improved fastener for attaching a shaped molding or similar element across the gap between the edge of a window panel and a fillister in which the panel is supported.

Another object of the invention is to provide a fastener of the type described that attaches the molding across the gap without the need for welded studs or other such members fixed to the fillister.

Another object of the invention is to provide a fastener of the type described that resiliently seats and positions itself within the fillister and that accommodates tolerances both in the width of the gap between the edge of the panel and adjacent side of the fillister and in the spacing between the inside surface of the panel and the side of the fillister adjacent thereto.

Another object of the invention is to provide a fastener of the type described that, once assembled in the gap, minimizes the likelihood of the inadvertent detachment of the molding from the fastener and of the fastener from the gap.

Another object of the invention is to provide a fastener of the type described that is both simple and economical to produce.

Still another object of the invention is to provide a fastener of the type described that is particularly adapted for attaching a shaped embellishing molding across the gap between a fixed window panel and mounting fillister formed in the bodywork of an automotive vehicle.

A still further object of the invention is to combine the vehicle gripping components and molding engaging components of the fastener in a single unit having anti-rattle features thereby greatly simplifying mass production assembly procedures.

SUMMARY OF THE INVENTION

Briefly, a fastener embodying the invention is used for mounting a molding across the gap between a panel and a fillister in which the panel is mounted. The fastener includes a base that fits within the gap and rests on the side of the fillister adjacent the edge of the panel, (i.e., the first side of the fillister). Extending in opposite directions outwardly and upwardly from the base is a pair of resilient wings. The free end of each wing includes a forwardly directed, beveled bearing face that is downwardly inclined at an angle, typically about 45 degrees, to the vertical.

The fastener is inserted in the gap by engaging the beveled bearing faces on the wings against the edge of the panel and pushing the base toward the panel and into the gap. When fully in the gap, the bearing faces on the wings resiliently bear against the inside corner of the edge of the panel, rather than embrace the edge of the panel as in most prior stud-less fasteners. Because of the resiliency of the wings, variations in width of gap between the edge of the panel and the first side of the fillister are taken up by the fastener. Because of the beveled bearing faces on the wings, variations in the spacing between the inside surface of the panel and the second side of the fillister are also taken up. If, for example, this spacing is smaller than normal, the inside corner of the panel will bear against a relatively high portion of the bearing face of each wing; whereas, if this spacing is larger than normal, the inside corner of the panel will bear against a relatively low portion of the bearing face of each wing. In either case, however, the fastener tends to assume the same general position in the fillister. The beveled bearing faces also convert what would normally be downwardly directed reacting force resulting from the resiliency of the wings to an oblique reacting force which loads the fastener into the fillister against both the first and second side thereof. The fastener thus resiliently seats and positions itself in reference to the fillister rather than in reference to the edge of the panel as is the case with most prior stud-less fasteners. As a result, variations in the width of the gap and in the spacing between the inside surface of the panel and the fillister do not affect the proper positioning of the fastener and, therefore, of the molding that mounts thereto.

The molding that mounts to the fastener and across the gap is typically formed as an elongated strip having a generally C-shaped cross section including a pair of opposed, inwardly turned flanges. Means are formed at the forward end of the fastener for engaging within these flanges, and holding the molding on the fastener. More specifically, these mounting means comprise at least one upstanding arm that extends upwardly from the forward end of the base and at least one ribbed leg or nose that extends from the forward end of the base below the upstanding arm. The molding is mounted to the fastener by engaging one of its flanges around the free end of the upstanding arm and the other of its flanges around the ribbed leg. The upstanding arm is made stiff and inflexible relative to the base. As a result, when the molding is forced away from the window panel, the upstanding arm, rather than flex with the molding, tends to tilt the entire fastener in the gap on its base. This has the effect of loading the beveled bearing faces on the wings more tightly up into the space behind the panel, thereby providing even greater resistance to the removal of the fastener from the gap. Means are also provided on the upstanding arm for maintaining the arm at an orientation relative to the base and window panel that favors tilting of the entire fastener, rather than the flexing of the arm relative to the base, when the molding is forced away from the panel. The upstanding arm is also dimensioned and shaped so that it tensions the engaged molding so as to cause the molding to grip the free end of the arm tightly and hence to prevent the inadvertent detachment of the molding therefrom.

The fastener can be economically fabricated as an integral molded plastic unit. Isolating tabs preferably project from the forward end of the base of the fastener in the vicinity of the upstanding arm and ribbed leg to prevent the mounted molding from directly contacting the panel and the fillister, thus avoiding rattle and abrasion due to the relative vibration of these parts. One embodiment of the fastener which is disclosed is adapted to mount in the gap first so that the molding can subsequently be mounted to the fasteners. Another embodiment which is disclosed is adapted to the mount in the molding first and then for mounting with the molding across the gap. Still another embodiment which is disclosed is adapted for use with moldings having different widths.

BRIEF DESCRIPTION OF THE DRAWINGS

The foregoing and other objects, features and advantages of the invention will be better understood from the following detailed description taken in conjunction with the accompanying drawing in which.

DETAILED DESCRIPTION OF ILLUSTRATIVE EMBODIMENTS

Figures 1, 2, 4:
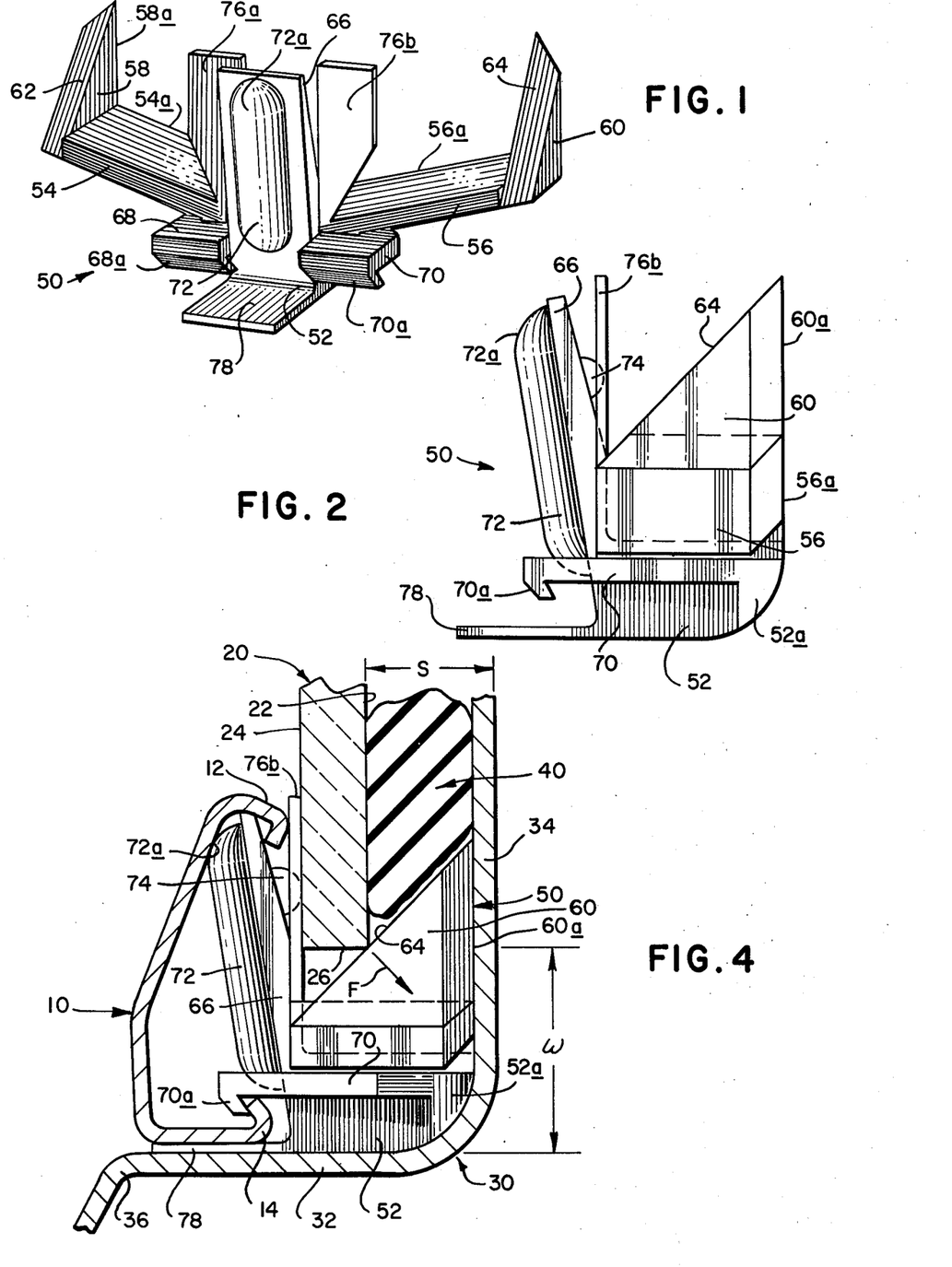
FIG. 1 is a front perspective view of a first fastener embodying the invention.
FIG. 2 is a side view of the fastener of FIG. 1.
FIG. 4 is a cross-sectional view showing the fastener of FIG. 1 mounted in the gap between a window panel and fillister in an automotive vehicle and showing an embellishing molding mounted to the fastener.

Referring now to the drawing, and initially to FIGS. 1-4 thereof, there is shown a first molding fastener embodying the invention and indicated generally by the reference numeral 50. As indicated in FIG. 4, the fastener 50 is particularly adapted for use in an automotive vehicle to mount an embellishing molding 10 across the gap W between the edge of a fixed window panel 20 and fillister 30 in which the panel 20 is supported. The fillister 30 is typically formed in the metal bodywork of the vehicle surrounding the window opening and typically includes first and second sides 32 and 34 which are oriented at an angle (e.g., 90 degrees) to one another. The window panel 20 includes an inside major surface 22, an outside major surface 24 and an edge 26 that is spaced from the fillister side 32 by a distance substantially equal to the gap W. The panel 20 is mounted in the fillister 30 by means of a continuous beading 40 of an adhesive that is squeezed between the inside panel surface 22 and the fillister side 34 around the periphery of the panel 20. Because of the adhesive beading 40, the panel 20 is spaced apart from the fillister side 34 by a distance S. The molding 10 is typically shaped to match the periphery of the window opening and to clip to the protruding parts of the fastener 50. Generally, a plurality of fasteners 50 are included at spaced positions around the periphery of the panel 20 so that the molding 10 may be secured in a plurality of places.

Figure 3:
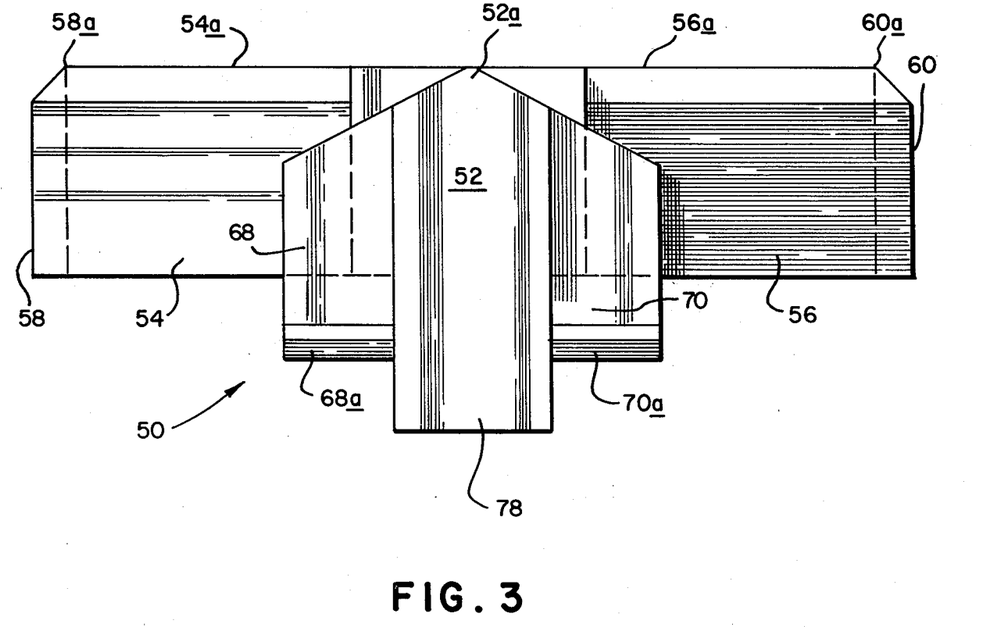
FIG. 3 is a bottom view of the fastener of FIG. 1.

Preferably, the fastener 50 is integrally fabricated from a material such as plastic. It includes a base 52, the lower face of which is essentially flat and adapted to bear against the fillister side 32. A pair of wings 54 and 56 project in opposite directions from the upper face of the base 52. The wings 54 and 56 extend at an upward angle from the base 52 and are so dimensioned that the free ends thereof can be pressed and flexed downwardly toward the base 52 and, when released, resiliently return to their normal upward positions.

An upstanding projection 58 and 60 is formed at the free end of the wings 54 and 56, respectively. Each projection 58 and 60 includes a rear edge 58a and 60a, respectively that is essentially straight and a forward-looking bearing face 62 and 64, respectively, that is downwardly inclined, or beveled, relative to its associated rear edge. Preferably, each bearing face 62 and 64 is downwardly beveled at an angle of about 45 degrees to its associated rear edge 58a and 60a and each bearing face extends for substantially the full width of each of the projections 58,60 in this fastener 50 and variations 80 and 90 of the fastener described hereinafter. As indicated in FIG. 4, the beveled bearing faces 62 and 64 are adapted to bear against the inside corner of the edge 26 of the window panel 20.

The rear edges 58a and 60a of the projections 58 and 60, the rear edges 54a and 56a of the wings 54 and 56, and the rear end 52a of the base 52 are all in the same, generally flat plane and adapted to bear against the fillister side 34. Preferably, the edges 58a, 60a, 54a and 56a are tapered, or beveled, as indicated in the drawing, to define a relatively sharp rear edge on the fastener 50. This sharp edge is useful in penetrating any of the adhesive beading 40 that may exist within the lower part of the fillister 30 to insure that the fastener 50 may be properly seated against the fillister side 34. As best seen in FIG. 3, the rear end 52a of the base 52 is also preferably tapered to a point. The tapered end 52a, in addition to penetrating any of the adhesive beading 40 that may exist at the inside corner of the fillister 30, also helps to equalize the load on the two wings 54 and 56 when the fastener 50 is mounted in the fillister 30.

An arm 66 projects upwardly from the forward end of the base 52. A pair of legs 68 and 70 projects forwardly from opposite sides of the base 52 below the upstanding arm. The forward end of each of the legs 68 and 70 includes a downwardly and rearwardly extending rib 68a and 70a, respectively. As seen in FIG. 4, the molding 10 is generally C-shaped and the opposed sides thereof are formed as inwardly turned flanges 12 and 14. The molding 10 is mounted to the fastener 50 by engaging the upper molding flange 12 over the free end of the upstanding arm 66 and then inwardly pressing the lower end of the molding 10 until the lower molding flange 14 clears and engages behind the ribs 68a and 70a, respectively.

The forward face of the arm 66 includes elongated protuberance 72. When the molding 10 is applied to the arm 66, the upper end 72a of the protuberance 72 bears against the upper inside surface of the molding 10 and bends, or tensions, the molding 10 at the point, causing the upper molding flange 12 to resiliently grip the inside surface of the arm 66.

The protuberance 72 also reinforces the arm 66 against bending relative to the base 52. The arm 66 is thus relatively stiff and inflexible and, if the upper end of the molding 10 is forced away from the window panel 20, the arm 66, rather than flex, tends to tilt the entire fastener 50 in the fillister 30. The beveled bearing faces 62 and 64 on the wings 54 and 56 are, in turn, loaded upwardly and tilted toward the inside surface 22 of the panel 20. As a result, when the molding 10 is forced away from the panel 20, the fastener 50, in effect, grips the panel 20 more tightly to prevent its dislodgment from the fillister.

In this regard, as indicated in FIGS. 1, 2 and 4, the arm 66 is preferably inclined forwardly relative to the base 52 at a small angle that favors tilting of the base 52 when free end of the arm 66 is downwardly pulled. A bubble-like protuberance 74 is formed on the inside surface of the arm 66 that, as indicated in FIG. 4, is adapted to bear against the outside panel surface 24 to maintain the arm 66 at the preferred angle after the fastener 50 is mounted.

A pair of isolating tabs 76a and 76b project upwardly from the base 52 on opposite sides of the arm 66. Another isolating tab 78 projects forwardly from the lower end of the base 52. The tabs 76a and 76b prevent direct contact between the upper part of the molding 10 and the outside surface 24 of the window panel 20, while the tab 78 prevents direct contact between the lower part of the molding 10 and the fillister side 32.

Because of manufacturing and assembly tolerances, the gap W and spacing S between the panel 20 and fillister side 34 vary from vehicle to vehicle, and typically, in the same vehicle, around the periphery of the panel 20. Each fastener 50 should be capable of securely mounting in the fillister despite these tolerances. Also, for aesthetic reasons, it is desirable that each fastener 50 be capable of positioning the molding 10 directly above the outer edge 36 of the fillister 30, as indicated in FIG. 4, despite the tolerances. With prior fasteners, variations in the spacing S are generally directly translated into variations in the position of the molding 10 relative to the fillister edge 36.

With the fastener 50, variations in the width of the gap W are taken up by the resiliency of the wings 54 and 56. Preferably, the length of the wings 54 and 56 in the fastener 50 and the angle at which they extend upwardly from the base 52 are selected such that, for a gap W of normal width, the wings 54 and 56 must be downwardly flexed to a certain, intermediate position to fit therein, as can be appreciated by comparing FIG. 2 with FIG. 4. Because of the tendency of the wings 54 and 56 to return to their normal, upward position, the fastener 50 is securely anchored in the fillister. If the gap W has a width that is either greater or less than the normal width, the wings 54 and 56 will be downwardly flexed to a position that is either above or below, respectively, the intermediate position. In general, the amount of downward flex in the wings 54 and 56 can be made sufficient to accommodate the range of widths of the gap W encountered in conventional vehicular window panel and fillister assemblies.

Variations in the spacing S between the panel 20 and fillister side 34 are also accommodated by the fastener 50 because of the beveled bearing faces 62 and 64 on the wings 54 and 56, respectively. Generally, if the spacing S is normal, the inside corner of the panel edge 26 will contact an intermediate portion of the bearing faces 62 and 64, as indicated in FIG. 4. If the spacing S is smaller than normal, then the wings 54 and 56 will be downwardly flexed below the position shown in FIG. 4 and the inside corner of the panel edge 26 will contact a relatively high portion of the bearing faces 62 and 64. If, on the other hand, the spacing S is larger than normal, the wings 54 and 56 will move upwardly above the position shown in FIG. 4 and the inside corner of the edge 26 will contact a relatively low portion of the bearing faces 62 and 64. The beveled bearing faces 62 and 64 and resiliency of the wings 54 and 56 also give rise to a reacting force acting in an oblique direction, as indicated generally by the arrow F in FIG. 4, which seats the fastener 50 in the fillister 30 and flushly against both of the fillister sides 32 and 34. The fastener 50 will thus tend to position itself against the fillister side 34 despite variations in the spacing S. This helps insure that the molding 10 is always properly positioned relative to the edge 36 of the fillister 30.

Figures 5, 6, 7:
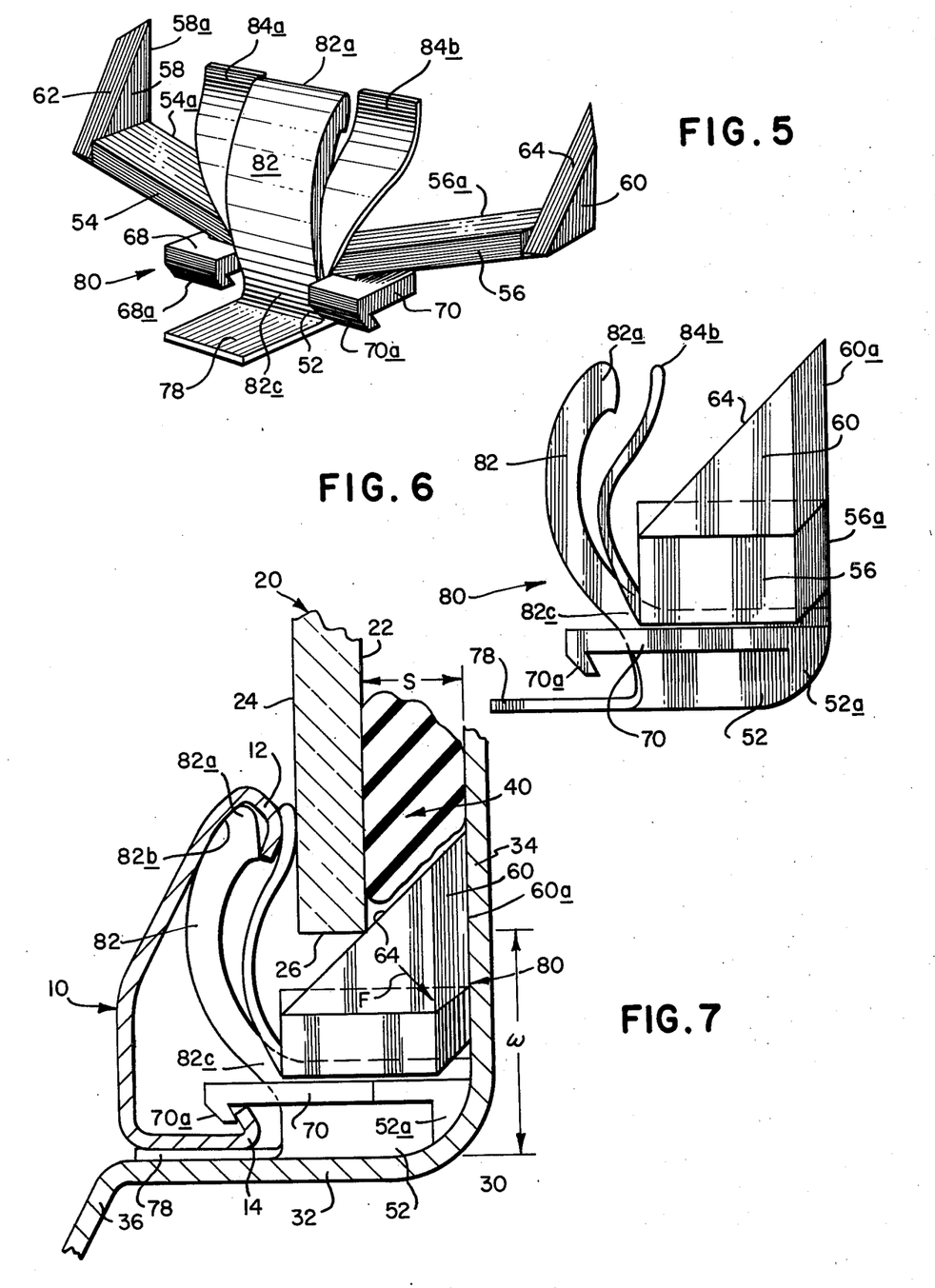
FIG. 5 is a front perspective view of a second fastener embodying the invention.
FIG. 6 is a side view of the fastener of FIG. 4.
FIG. 7 is a cross sectional view showing the fastener of FIG. 5 installed in the gap between a window panel and fillister in an automotive vehicle and showing an embellishing molding mounted to the fastener.

As noted, the fastener 50 is adapted to mount in the fillister so that the molding 10 may subsequently be snapped onto the mounted fastener. FIGS. 5, 6 and 7 of the drawing illustrate a second fastener 80 embodying the invention which is adapted for use with a window panel and fillister assembly of the type shown in FIG. 4 but which snaps into the molding 10 first and then mounts with the molding 10 in the fillister. The fastener 80 is substantially similar in construction and use to the fastener 50 previously described. Those parts of the fastener 80 that are illustratively identical to corresponding parts of the fastener 50 are referenced by the same reference numerals as are used in FIGS. 1-4 and are intended to function identically. Those parts of the fastener 80 that differ from corresponding parts of the fastener 50 are specifically discussed below.

Extending upwardly from the front end of the base 52 in the fastener 80 is an arm which, unlike the arm 66 in the fastener 50, is arcuately shaped. The fastener 80 is mounted in the molding 10 by inserting the free end 82a of the arm 82 within the upper molding flange 12 and pushing the base 52 toward the molding 10 until the ribbed legs 68 and 70 engage within the lower molding flange 14. The free end 82a of the arm 82 is also so dimensioned that it bends, or tensions, the molding 10 at the point 82b (FIG. 7) causing the upper molding flange 12 to resiliently grip the free end 82a of the arm 82.

The base portion 82c of the arm 82 is made sufficiently thick that the arm 82 is stiff and inflexible relative to the base 52. Because of this and because of the arcuate shape of the arm 82, a force tending to pull the upper end of the molding 10 away from the panel 20 is translated into a compressive force directed along the curvature of the arm 82. This force will tend to tilt the entire fastener 80 in the fillister 30 and load the beveled bearing faces more strongly up into the space S behind the panel 20, thus providing increased resistance to the dislodgment of the fastener 80 from the fillister.

A pair of arcuately shaped, relatively flexible isolating tabs 84a and 84b project upwardly on opposite sides of the arm 82 and serve to prevent the upper molding flange 12 from directly contacting the outside surface 24 of the panel 20.

Figures 8, 9, 10:
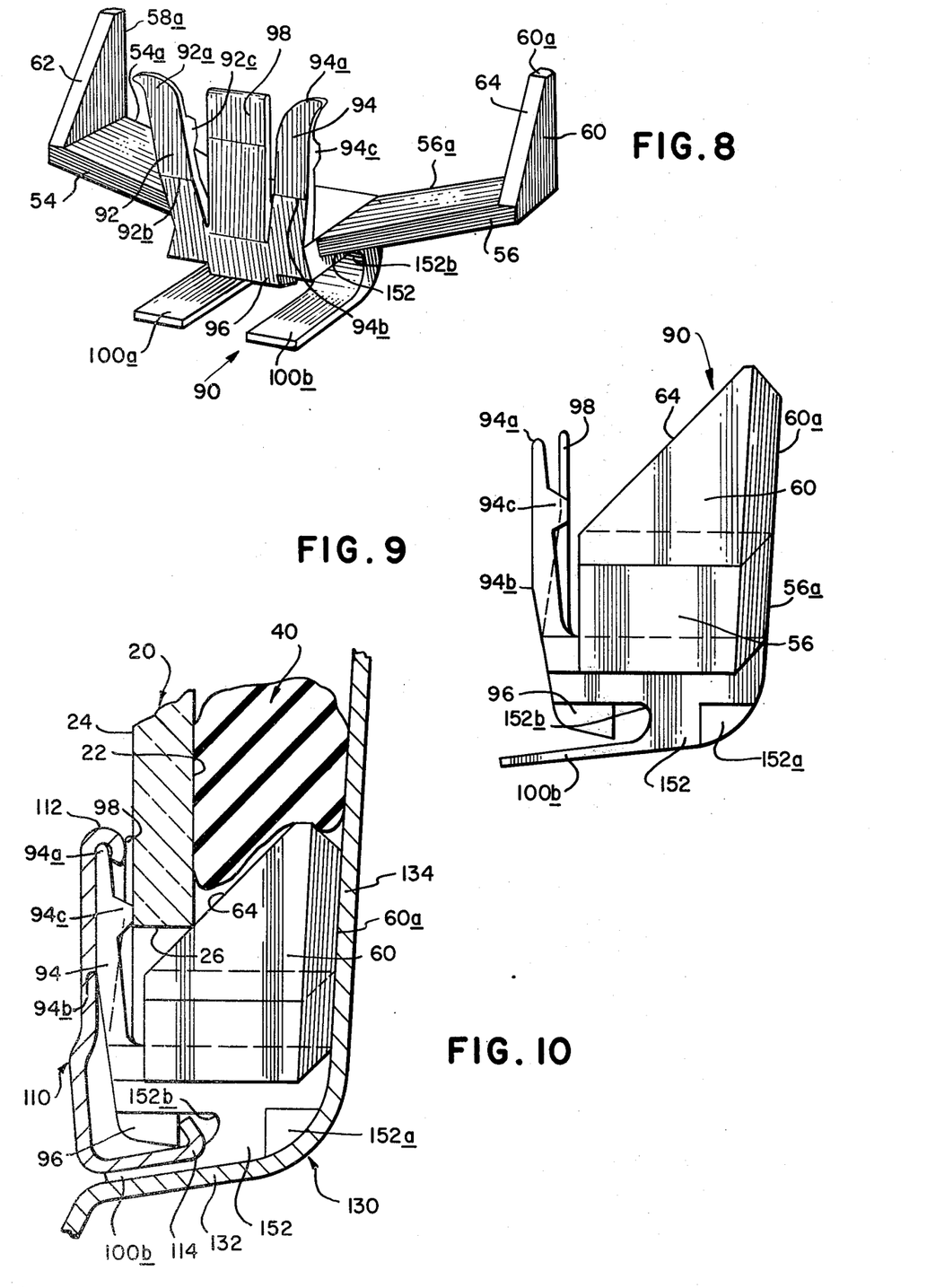
FIG. 8 is a front perspective view of a third fastener embodying the invention and adapted for use with moldings of different widths.
FIG. 9 is a side view of the fastener of FIG. 8.
FIG. 10 is a cross sectional view showing the fastener of FIG. 8 installed in the gap between a window panel and fillister in an automotive vehicle and showing an embellishing molding mounted to the fastener.

FIGS. 8, 9 and 10 illustrate a third fastener 90 embodying the invention. One difference between the fastener 90 and those previously described is that the fastener 90 is specifically adapted for use with moldings of more than one width. Other differences are discussed below. Again, many of the parts of the fastener 90 are substantially identical to corresponding parts of the fastener 50. These parts are referenced by the same reference numerals in FIGS. 8, 9 and 10 as are used in the other figures and are intended to function identically.

In FIG. 10, a fillister 130 is shown in which the window panel 20 is mounted by the adhesive beading 40 as previously described. The fillister 130 differs slightly from the fillister 30 shown in FIGS. 4 and 7 in that the angle between its sides 132 and 134 is illustratively greater than 90 degrees. As best seen in FIG. 9, the portions of the fastener 90 that are adapted to bear against the fillister sides 132 and 134 are preferably similarly inclined. More specifically, the fastener 90 includes a base 152, the lower face of which is inclined so that it fits flushly against the fillister side 132. The rear edge of the fastener 90, as defined by the rear edges 54a and 56a of the wings 54 and 56 and rear edges 58a and 60a of the wing projections 58 and 60, respectively, is also preferably inclined so that it fits flushly against the fillister side 134. A molding 110, which is shown mounted to the fastener 90 in FIG. 10, includes an upper flange 112 and a lower flange 114, but has a somewhat different cross-sectional shape than the molding 10 shown in FIGS. 4 and 7. The fillister 130 and molding 110 may, for example, be of the type used in a vehicle that is of a different make and model than the vehicle in which the fillister 30 and molding 10 are used.

As seen in FIG. 8, a pair of mirror image arms 92 and 94 extend upwardly and outwardly from the front end of the base 152 in fastener 90. The free end 92a and 94a of each arm is contoured into the shape of the rounded, laterally outwardly directed point. The front end of the base 152 includes a recess 152b in which a nose 96 is formed. The fastener 90 is adapted to mount in the gap W between the edge 26 of the panel 20 and fillister side 132 in the same manner as the fastener 50. The molding 110 is then mounted to the fastener 90 by engaging the upper molding flange 112 around the free ends 92a and 94a of the arms 92 and 94 and pushing the lower part of the molding 110 inwardly toward the fastener 90 until the lower molding flange 114 engages behind the nose 96, as indicated in FIG. 10. When the arms 92 and 94 are engaged within the molding 110, a slight knee 92b and 94b on the forward face of each arm will bear against and tension the inside surface of the molding 110, causing the upper molding flange 112 to firmly grip the free ends 92a and 94a of the arms.

The arms 92 and 94, though preferably relatively stiff and inflexible in a forward direction relative to the base 152, are adapted to resiliently flex laterally outwardly away from one another. This outward lateral flex of the arms 92 and 94 allows the fastener 90 to be used with a molding like the molding 110 but of different (e.g., smaller) width. The fastener 90 can thus be used in conjunction with different window panels in the same vehicle even though the molding surrounding one of the panels may be of a different width than the molding surrounding the other panel and in conjunction with a molding strip which varies in width along its length.

As with the other fasteners 50 and 80 described above, the rear end 152a of the base 152 in the fastener 90 is preferably tapered to a point so that it freely penetrates any of the adhesive beading 40 that may find its way to the inside corner of the fillister 130 and so that the load on the wings 54 and 56 is equalized when the fastener 90 is mounted. As can be appreciated from FIG. 9, the arms 92 and 94 are also preferably inclined at a slight forward angle relative to the base 152 which favors tilting of the entire fastener 90 in the fillister when the upper part of the molding 110 is pulled away from the panel 20. A protuberance 92c and 94c is formed on the inside surface of each arm 92 and 94, respectively, which is adapted to bear against the outside surface 24 of the panel 20 and to maintain the arms at the desired inclination.

The fastener 90 also includes a single isolating tab 98 that extends upwardly from the front end of the base 152 between the arms 92 and 94 and that prevents the upper part of the molding 110 from directly contacting the outside panel surface 24. A pair of isolating tabs 110a and 100b project forwardly from the lower end of the base 152 and serve to prevent the lower part of the molding 110 from directly contacting the fillister side 132.

Each of the above described fasteners 50, 80, and 90 is preferably integrally fabricated from a plastic material such as nylon. As such, each fastener can be economically molded using an essentially one-step process such as injection molding.

As will now be apparent, there are described in the foregoing specification, three specific embodiments of a fastener for securing a shaped molding relative to the edge of a window panel and fillistered support surface supporting the panel in an automotive vehicle. It will also be apparent, however, that modifications can be made to the specifically disclosed embodiments and that such modified versions may have all or some of the desirable features and advantages of the specifically described fasteners. The fasteners may, for example, be adapted for use in various applications other than automotive vehicles. Therefore, it is the object of the appended claims to cover all such variations and modifications as come within the true spirit and scope of this invention.

What we claim as new and desire to secure by Letters Patent of the United States is:

1. A fastener for attaching a strip element across a gap between the edge of a panel and a support surface supporting the panel, the panel including an inside major surface, and outside major surface, a peripheral edge and an inside peripheral corner between its edge and its inside major surface, the support surface including a first side portion spaced from and adjacent to the edge of the panel and a second side portion spaced from and adjacent to the inside major surface of the panel, said fastener being structured for positioning itself in the gap relative to the support surface rather than relative to the edge of the panel, said fastener comprising:
A. a base adapted to fit within the gap between the first side portion of the support surface and the edge of the panel;
B. first and second wings projecting in essentially opposite directions upwardly and outwardly from said base, said wings being resiliently deflectible downwardly relative to said base, the free end of each of said wings including a beveled bearing face oriented such that, when said fastener is mounted in the gap, said beveled faces resiliently bear against the inside peripheral corner of the panel and develop an oblique reacting force tending to load said fastener against both the first and second side portions of the support surface, said beveled faces being of sufficient length to resiliently bear against the inside peripheral corner of the panel and to develop the oblique reacting force despite variations in either direction from a normal spacing in the spacing between the inside major surface of the panel and the second side portion of the support surface; and
C. means projecting from said base for engaging and retaining the strip element across the gap.

2. A fastener as recited in claim 1 in which the free end of each of said wings includes an integral projection extending upwardly relative to the remainder of said wings and in which said beveled bearing faces are formed on said integral projections of each of said wings and extend along the full width of said wings at said free ends.

3. A fastener as recited in claim 2 in which said wings and said integral projections of said wings each include a rear edge occupying essentially the same plane and oriented for bearing against the second side portion of the support surface and in which said beveled bearing faces are forwardly inclined at an angle of about 45 degrees to said plane.

4. A fastener as recited in claim 3 in which the rear edges of said wings and said integral projections of said wings are tapered in thickness so as to define a relatively sharp rear edge on said fastener for bearing against the second side portion of the support surface.

5. A fastener as recited in claim 1 in which said base includes a front end and a rear end, the rear end of said base being adapted to bear against the second side portion of the support surface.

6. A fastener as recited in claim 5 in which the rear end of said base is tapered so as to define a relatively sharp edge for bearing against the second side portion of the support surfaces.

7. A fastener as recited in claim 5 in which the strip element is generally C-shaped in cross section including first and second, opposed inwardly turned flanges and in which said strip element engaging and retaining means comprises
   i. an arm including a free end projecting upwardly from the front end of said base and adapted to overlap the outside major surface of the panel, and
   ii. first and second legs extending forwardly from opposite sides of the front end of said base, each of said legs including a rearwardly and downwardly extending rib, the strip element being mountable to said fastener by engaging the first of its flanges over the free end of said arm and the second of its flanges to the rear of said ribs on said legs.

8. A fastener as recited in claim 7 in which said arm is substantially stiff and inflexible relative to said base.

9. A fastener as recited in claim 8 in which said arm includes a front face and a rear face and an elongated protuberance formed on the front face of said arm for reinforcing said arm against bending relative to said base.

10. A fastener as recited in claim 9 in which a portion of said protuberance adjacent the free end of said arm is adapted to bear against the inside surface of the strip element and to bend the strip element when the strip element is mounted to said fastener thereby to cause the first strip element flange to resiliently grip the free end of said arm.

11. A fastener as recited in claim 9 in which said arm is inclined at an angle forwardly of said base so as to favor tilting of said fastener relative to the support surface when the free end of said arm is pulled away from the outside major surface of the panel.

12. A fastener as recited in claim 11 in which the rear face of said arm includes a protuberance adapted to bear against the outside major surface of the panel and to maintain said arm at said forward angle when said fastener is positioned in the gap.

13. A fastener as recited in claim 8 in which said arm is arcuately shaped extending initially upwardly and forwardly from the front end of said base and bending rearwardly to its free end.

14. A fastener as recited in claim 13 in which the free end of said arm is so dimensioned as to bear against the inside surface of the strip element and to bend the strip element when the strip is mounted to said fastener thereby to cause the first strip element flange to resiliently grip the free end of said arm.

15. A fastener as recited in claim 7 further including first and second tabs projecting upwardly from the front end of said base on opposite sides of said arm and adapted to overlap the outside surface of the panel and to prevent the strip element from directly contacting the panel.

16. A fastener as recited in claim 7 further including a tab projecting forwardly from the front end of said base below said legs and adapted to contact the first side portion of the support surface and to prevent the strip element from directly contacting the support surface.

17. A fastener as recited in claim 5 in which the strip element is generally C-shaped in cross section including first and second, opposed inwardly turned flanges and in which said strip element engaging and retaining means comprise
   i. a pair of arms each including a free end and each projecting upwardly from the front end of said base and outwardly at an angle away from each other and adapted to overlap the outside major surface of the panel, and
   ii. a nose formed in the front end of said base and including a rearwardly directed face, the strip element being mountable to said fastener by engaging the first of its flanges over the free ends of said arms and the second of its flanges to the rear of the rearwardly directed face on said nose.

18. A fastener as recited in claim 17 in which said arms are relatively outwardly flexible away from each other and thereby adapted to engage within strip elements including first and second inwardly turned flanges and having different widths between the flanges.

19. A fastener as recited in claim 17 in which said arms are substantially stiff and inflexible when pulled forwardly of said base.

20. A fastener as recited in claim 17 in which each of said arms includes a front face and a rear face and in which the front face of each of said arms includes a knee adapted to bear against the inside surface of the strip element and to bend the strip element when the strip element is mounted to said fastener thereby to cause the first strip element flange to resiliently grip the free ends of said arms.

21. A fastener as recited in claim 17 in which each of said arms is inclined at an angle forwardly of said base so as to favor tilting of said fastener relative to the support surface when the free ends of said arms are pulled away from the outside surface of the panel.

22. A fastener as recited in claim 21 in which each of said arms includes a front face and a rear face and in which the rear face of each of said arms includes a protuberance adapted to bear against the outside major surface of the panel and to maintain said arms at said forward angle when said fastener is positioned in the gap.

23. A fastener as recited in claim 17 in which the free ends of said arms are contoured to define rounded, outwardly directed points.

24. A fastener as recited in claim 17 further including a tab projecting upwardly from the front end of said base between said arms and adapted to overlap the outside surface of the panel and to prevent the strip element from directly contacting the panel.

25. A fastener as recited in claim 17 further including first and second tabs projecting forwardly from the front end of said base below and on opposite sides of said nose and adapted to contact the first side portion of the support surface and to prevent the strip element from directly contacting the support surface.

26. A fastener as recited in claim 1 in which the strip element comprises a shaped embellishing molding, the panel comprises a window panel and the support surface comprises a fillister formed in the bodywork of a vehicle and defining a window opening in which the window panel is to be mounted by means of an adhesive.

27. A fastener as recited in claim 1 in which said fastener is integrally fabricated from a plastic material.

28. A fastener as recited in claim 7 in which said fastener is integrally fabricated from a plastic material.

29. A fastener as recited in claim 17 in which said fastener is integrally fabricated from a plastic material.

* * * * *